(12) United States Patent
Park et al.

(10) Patent No.: US 10,637,073 B2
(45) Date of Patent: Apr. 28, 2020

(54) POSITIVE ELECTRODE FOR METAL-AIR BATTERY AND METAL-AIR BATTERY INCLUDING THE SAME

(71) Applicant: Samsung Electronics Co., Ltd., Suwon-si, Gyeonggi-do (KR)

(72) Inventors: Jungock Park, Yongin-si (KR); Mokwon Kim, Daejeon (KR); Joonhee Kim, Seoul (KR); Kyounghwan Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 87 days.

(21) Appl. No.: 15/651,406

(22) Filed: Jul. 17, 2017

(65) Prior Publication Data

US 2018/0090770 A1    Mar. 29, 2018

(30) Foreign Application Priority Data

Sep. 27, 2016    (KR) .................. 10-2016-0124247

(51) Int. Cl.
*H01M 4/00* (2006.01)
*H01M 4/96* (2006.01)
(Continued)

(52) U.S. Cl.
CPC ............. *H01M 4/96* (2013.01); *H01M 4/382* (2013.01); *H01M 4/405* (2013.01); *H01M 4/861* (2013.01);
(Continued)

(58) Field of Classification Search
CPC .. H01M 4/861; H01M 4/8642; H01M 4/8657; H01M 4/96; H01M 4/382; H01M 10/0565; H01M 12/08
See application file for complete search history.

(56) References Cited

U.S. PATENT DOCUMENTS 6,277,514 B1 *   8/2001   Ying ................. H01M 2/16
                                                              429/129
2010/0086849 A1    4/2010   Mizuno et al.
(Continued)

FOREIGN PATENT DOCUMENTS

EP         2985260 A1      2/2016
KR    1020130046851 A      5/2013
(Continued)

OTHER PUBLICATIONS

European Search Report for European Patent Application No. 17187507.3 dated Nov. 11, 2017.

*Primary Examiner* — Cynthia H Kelly
*Assistant Examiner* — Monique M Wills
(74) *Attorney, Agent, or Firm* — Cantor Colburn LLP

(57) ABSTRACT

A positive electrode for a metal-air battery, the positive electrode including: a first layer disposed on a surface of an electrolyte membrane or a separator and including a first carbon material, a first electrolyte, and a first binder having an affinity with the first electrolyte; and a second layer disposed on the first layer and including a second carbon material, a second electrolyte, and a second binder having an affinity with the second electrolyte, wherein the first carbon material is different from the second carbon material, the first carbon material has a Brunauer Emmett Teller specific surface area which is greater than a Brunauer Emmett Teller specific surface area of the second carbon material, and wherein an amount of the first binder may be about 1.5 times to about 3 times greater than an amount of the second binder.

22 Claims, 4 Drawing Sheets

(51) Int. Cl.
- *H01M 4/38* (2006.01)
- *H01M 8/1018* (2016.01)
- *H01M 10/0565* (2010.01)
- *H01M 12/08* (2006.01)
- *H01M 4/40* (2006.01)
- *H01M 4/86* (2006.01)
- *H01M 4/02* (2006.01)

(52) U.S. Cl.
CPC ....... *H01M 4/8642* (2013.01); *H01M 4/8657* (2013.01); *H01M 8/1018* (2013.01); *H01M 10/0565* (2013.01); *H01M 12/08* (2013.01); H01M 2004/027 (2013.01); H01M 2004/8689 (2013.01); H01M 2008/1095 (2013.01); Y02E 60/128 (2013.01)

(56) References Cited

U.S. PATENT DOCUMENTS

| | | | |
|---|---|---|---|
| 2013/0029234 A1 | 1/2013 | Roev et al. | |
| 2013/0183592 A1* | 7/2013 | Roev | H01M 4/8605 |
| | | | 429/405 |
| 2014/0193720 A1 | 7/2014 | Mizuno | |
| 2014/0212760 A1 | 7/2014 | Zhao et al. | |
| 2014/0332731 A1* | 11/2014 | Ma | C09D 7/70 |
| | | | 252/506 |
| 2015/0155566 A1* | 6/2015 | Kim | H01M 4/9083 |
| | | | 252/514 |
| 2015/0221952 A1 | 8/2015 | Ma et al. | |
| 2016/0293971 A1* | 10/2016 | Sun | H01M 12/06 |

FOREIGN PATENT DOCUMENTS

| | | |
|---|---|---|
| KR | 1020140080837 A | 7/2014 |
| KR | 1020150060467 A | 6/2015 |
| KR | 1020150136397 A | 12/2015 |
| WO | 2010027337 A9 | 3/2010 |
| WO | 2011009124 A2 | 1/2011 |
| WO | 2015061383 A1 | 4/2015 |

* cited by examiner

POSITIVE ELECTRODE FOR METAL-AIR BATTERY AND METAL-AIR BATTERY INCLUDING THE SAME

CROSS-REFERENCE TO RELATED APPLICATION

This application claims priority to and the benefit of Korean Patent Application No. 10-2016-0124247, filed on Sep. 27, 2016, in the Korean Intellectual Property Office, and all the benefits accruing therefrom under 35 U.S.C. § 119, the content of which in its entirety is incorporated herein by reference.

BACKGROUND

1. Field

The present disclosure relates to positive electrodes for metal-air batteries and metal-air batteries including the same.

2. Description of the Related Art

Metal-air batteries, for example, lithium air batteries, have a theoretical energy density per unit weight of 3,500 Watt-hours per kilogram (Wh/kg) or greater, which is approximately 10 times that of a lithium-ion battery.

A lithium air battery generally includes a negative electrode capable of intercalating and deintercalating lithium ions, a positive electrode (air electrode) that uses oxygen as an active material and oxidizes and reduces oxygen, and a separator between the negative electrode and the positive electrode.

In such a lithium air battery, during discharging, lithium ions and electrons are generated by oxidation of the negative electrode and the generated lithium ions are transferred via an electrolyte, and the electrons are transferred to the positive electrode (air electrode) along an external electric wire. Oxygen included in the air outside of the lithium air battery is introduced into the positive electrode to produce a byproduct such as $Li_2O_2$. During charging, the reaction proceeds in an opposite manner. Cycle lifespan characteristics of lithium air batteries may deteriorate during charging and discharging through the reactions described above.

To address these problems, there is a need to develop a novel positive electrode for a metal-air battery and a metal-air battery including the same.

SUMMARY

Provided is a positive electrode for a metal-air battery.

Provided is a metal-air battery including the positive electrode.

According to an aspect of an embodiment, a positive electrode for a metal-air battery including: a first layer disposed on a surface of an electrolyte membrane or a separator and including a first carbon material, a first electrolyte, and a first binder having an affinity with the first electrolyte; and a second layer disposed on the first layer and including a second carbon material, a second electrolyte, and a second binder having an affinity with the second electrolyte, wherein the first carbon material is different from the second carbon material, the first carbon material has a Brunauer Emmett Teller (BET) specific surface area which is greater than a BET specific surface area of the second carbon material, and wherein an amount of the first binder is about 1.5 times to about 3 times greater than an amount of the second binder.

According to an aspect of another embodiment, a metal-air battery includes a negative electrode including lithium (Li) or a Li alloy, the positive electrode described above, and a separator between the negative electrode and the positive electrode.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
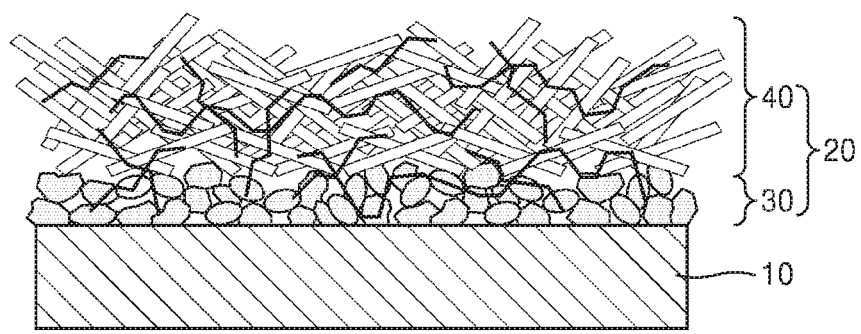
FIG. 1 is a cross-sectional view of a structure of a positive electrode for a metal-air battery, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component,"

"region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a positive electrode for a metal-air battery, according to an embodiment, and a metal-air battery including the same will be described in detail with reference to the accompanying drawings. The embodiments described herein are provided only for illustrative purposes and are not intended to limit the present disclosure. The present disclosure is defined only by the scope of the claims described below.

A metal-air battery, for example a lithium air battery, may include a negative electrode capable of intercalating and deintercalating lithium ions, a positive electrode capable of using oxygen as an active material, and an electrolyte capable of transferring lithium ions.

The electrolyte may include an aqueous electrolyte and a non-aqueous electrolyte. In a lithium air battery including an aqueous electrolyte as an electrolyte, severe corrosion may occur due to contact between Li metal in the negative electrode and the aqueous electrolyte. In a lithium air battery including a non-aqueous electrolyte as an electrolyte, the following reaction mechanism as represented by Chemical Equation 1 below, may occur:

$$4Li+O_2 \leftrightarrow 2Li_2O+4e^- \quad E^0=2.91 \text{ V}$$

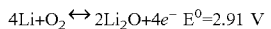

$$2Li+O_2 \leftrightarrow Li_2O_2+2e^- \quad E^0=3.10V \quad \text{Chemical Equation 1}$$

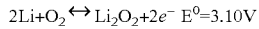

According to Chemical Equation 1 above, during discharging, lithium derived from the negative electrode reacts with oxygen introduced from the positive electrode (air electrode) to generate a lithium oxide and the oxygen is reduced (oxygen reduction reaction (ORR)). In contrast, during charging, the lithium oxide is reduced, and oxygen is generated by oxidation (oxygen evolution reaction (OER)).

During the discharging, a carbon material included in the positive electrode provides a surface for the reaction between oxygen and lithium ions, and a generated byproduct such as $Li_2O_2$ fills the pores of the positive electrode, while the electrolyte is discharged outside of the positive electrode. Due to the discharge of the electrolyte, which is irreversible, the resistance of the electrolyte membrane increases and the capacity and cycle lifespan characteristics of the lithium air battery may deteriorate.

FIG. 1 is a cross-sectional view of a structure of a positive electrode 20 for a metal-air battery, according to embodiment.

As illustrated in FIG. 1, the positive electrode 20 is formed as two layers on an electrolyte membrane or a separator 10. The separator or electrolyte membrane 10 may include a coating layer (not shown) formed thereon. The positive electrode 20 may be a double-layered (e.g., two layer) positive electrode including: a first layer 30 including a first carbon material, a first electrolyte, and a first binder having an affinity with the first electrolyte; and a second layer 40 including, on the first layer, a second carbon material, a second electrolyte, and a second binder having an affinity with the second electrolyte. The positive electrode may comprise, consist essentially of, or consist of two layers, e.g., the first layer 30 and the second layer 40.

The term "affinity" as used herein refers to a chemical affinity. The chemical affinity refers to the force that causes two different chemical species to form a new compound and/or the property of an atom or a compound to combine with a different atom or compound through a chemical reaction.

Due to the affinity between the electrolyte and the binder, the double-layered positive electrode may be capable of preventing the electrolyte in the positive electrode from being discharged outside of the positive electrode by the product (e.g., $Li_2O_2$) generated in the positive electrode during the discharging.

The first carbon material may be different from the second carbon material. For example, the first carbon material may have a Brunauer Emmett Teller (BET) specific surface area which is greater than the BET specific surface area of the second carbon material, and the amount of the first binder may be about 1.5 times to about 3 times greater than the amount of the second binder.

The first binder may be identical to or different from the second binder.

As such, the positive electrode respectively includes, in the first layer and the second layer, the first carbon material and the second carbon material having different compositions and different BET specific surface areas as well as the first binder and the second binder that are present in different amounts. The positive electrode thus may have a double-layered structure having different pore structures and different compositions in the first layer and the second layer. In addition, the amount of the electrolyte discharged outside of the positive electrode may be controlled. Accordingly, the lithium air battery may have enhanced cycle lifespan characteristics.

Figure 2:
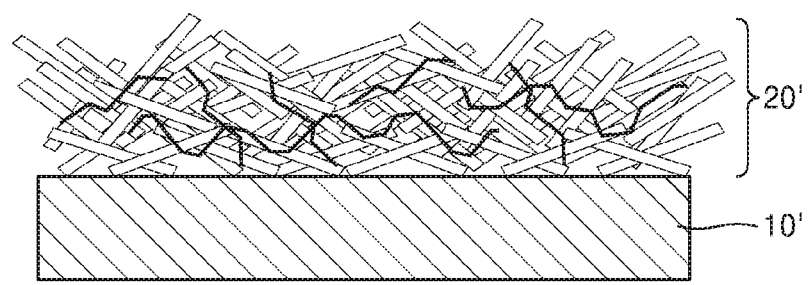
FIG. 2 is a cross-sectional view of a structure of a positive electrode for a metal-air battery, according to a comparative embodiment.

FIG. 2 is a cross-sectional view of a positive electrode 20' for a metal-air battery, according to a comparative embodiment.

As illustrated in FIG. 2, the positive electrode 20' is formed as a single layer on an electrolyte membrane or a separator 10'. The separator or electrolyte membrane 10' may include a coating layer (not shown) formed thereon. The positive electrode 20' includes an excess amount of an electrolyte (e.g., carbon material:electrolyte=about 1:10 to about 1:50 on a weight basis) to compensate for irreversible discharge of the electrolyte during discharging, and thus cycle lifespan characteristics of the metal-air battery may be achieved. On the other hand, when the electrolyte is used in a limited amount (e.g., carbon material:electrolyte=less than about 1:1.5 on a weight basis), the electrolyte is discharged outside of the positive electrode during the discharging, resulting in deterioration in the cycle lifespan characteristics of the metal-air battery.

In the positive electrode for a metal-air battery, the amount of the first binder is about 1.5 times to about 3 times greater than an amount of the second binder, and thus the first carbon material used in the first layer has a stronger binding strength than the binding strength of the second carbon material. Accordingly, the first layer may be thinner than the second layer. For example, a thickness of the first layer may account for about 1% to about 20%, or about 5 to about 15%, or about 7.5 to about 12%, of a total thickness of the positive electrode.

The positive electrode including the first layer having such a thin thickness forms a thin interface layer filled with an electrolyte during charging and discharging, thereby reducing the high level of interfacial resistance between an electrolyte membrane and the positive electrode which occurs due to the irreversible discharge of the electrolyte. Accordingly, the lithium air battery may have enhanced cycle lifespan characteristics.

The total thickness of the positive electrode may be from about 10 micrometers (µm) to about 100 µm. The total thickness of the positive electrode may be, for example, from about 10 µm to about 99 µm, for example, from about 10 µm to about 98 µm, for example, from about 10 µm to about 97 µm, for example, from about 10 µm to about 96 µm, for example, from about 10 µm to about 95 µm, for example, from about 10 µm to about 94 µm, for example, from about 10 µm to about 93 µm, for example, from about 10 µm to about 92 µm, for example, from about 10 µm to about 91 µm, or, for example, from about 10 µm to about 90 µm.

The thickness of the first layer may be, for example, from about 0.1 µm to about 20 µm. The thickness of the first layer may be, for example, from about 0.1 µm to about 19 µm, for example, from about 0.1 µm to about 18 µm, for example, from about 0.1 µm to about 17 µm, for example, from about 0.1 µm to about 16 µm, for example, from about 0.1 µm to about 15 µm, for example, from about 0.1 µm to about 14 µm, for example, from about 0.1 µm to about 13 µm, for example, from about 0.1 µm to about 12 µm, for example, from about 0.1 µm to about 11 µm, or, for example, from about 0.1 µm to about 10 µm.

The first carbon material may have a BET specific surface area of about 800 square meters per gram (m$^2$/g) to about 1500 m$^2$/g. The BET specific surface area of the first carbon material may be, for example, from about 800 m$^2$/g to about 1400 m$^2$/g, for example, from about 800 m$^2$/g to about 1300 m$^2$/g, for example, from about 800 m$^2$/g to about 1200 m$^2$/g, for example, from about 800 m$^2$/g to about 1100 m$^2$/g. The first carbon material having the BET specific surface area within the above ranges may be included in the first layer in an amount which is larger than an amount of the second carbon material in the second layer.

The first carbon material may have a particulate form. The particulate form may include various forms such as spherical, rectangular, polyhedral, and the like. A median particle diameter D50 of the first carbon material, which is described below, may be measured assuming that the particles are in a spherical form.

The terms "median particle diameter" or "median particle diameter D50" or "D50" as used interchangeably herein refer to the particle size at which 50% of the particles are smaller based on a cumulative distribution curve in which particles are accumulated in the order of the smallest particles to the largest particles, and a total number of the accumulated particles is 100%. The D50 particle size value may be measured using a method known to those of skill in the art. For example, D50 particle size may be measured using a particle size analyzer, or from images obtained from a transmission electron microscope (TEM) or a scanning electron microscope (SEM). In another embodiment, the particle diameter may be obtained using a measurement device based on dynamic light-scattering and performing data analysis on the measured values to count the number of particles for each particle size range, and calculating the D50 value therefrom.

The median particle diameter D50 of the first carbon material may be from about 20 nm to about 100 nm. The median particle diameter D50 of the first carbon material may be, for example, from about 20 nm to about 90 nm, for example, from about 20 nm to about 80 nm.

The first carbon material may include a carbon material including activated carbon, mesoporous carbon, graphene, or a combination thereof. The first carbon material may have porosity of about 40% to about 80%, or about 45% to about 75%, or from about 50% to about 65%. As used herein, the term "porosity" is used to refer to a measure of the empty space (i.e., voids or pores) in a material and is determined as a percentage of the volume of the pores/voids in a material based on a total volume of a material. The porosity of the first carbon material thus refers to the percentage of empty space (e.g., pores or voids) which is present between particles of the first carbon material of the first layer.

The first carbon material may have a larger BET specific surface area than the BET specific surface area of the second carbon material of the second layer and thus may easily transfer electrons on a surface thereof and have a higher porosity than the porosity of the second carbon material. Thus, during discharging, the pores of the first carbon material of the first layer are filled with the electrolyte, and then during charging, a predetermined amount of the electrolyte may be transferred into pores formed by the second carbon material of the second layer. As a result, during the charging and the discharging, the first layer acts as a thin interface layer filled with the electrolyte and thus helps retain the electrolyte between the positive electrode and the interface layer (i.e., the first layer) during the charging and the discharging, and thus, the lithium air battery may have enhanced cycle lifespan characteristics.

The second carbon material may have a BET specific surface area of about 200 m$^2$/g to less than 800 m$^2$/g. The BET specific surface area of the second carbon material may be, for example, from about 200 m$^2$/g to about 550 m$^2$/g, for example, from about 200 m$^2$/g to about 500 m$^2$/g, for example, from about 200 m$^2$/g to about 450 m$^2$/g.

The second carbon material may include a carbon material including carbon nanotubes, carbon nanofibers, carbon nanoribbons, carbon nanobelts, carbon nanorods, or a combination thereof. For example, the second carbon material may be carbon nanotubes.

The carbon nanotubes may include single-walled carbon nanotubes (SWCNTs), double-walled CNTs (DWCNTs), multi-walled CNTs (MWCNTs), rope carbon nanotubes, or a combination thereof. The carbon nanotubes may have an average diameter of, for example, about 1 nanometer (nm) to about 20 nm. The carbon nanotubes may have an average aspect ratio (average length/average diameter) of about 1 to about 20,000.

The average diameter and average aspect ratio of the carbon nanotubes may be measured using a known method, for example, from a TEM image, a high-resolution (HR)-TEM image, an SEM image, or a field-emission scanning microscope (FE-SEM) image, and/or a measurement device using dynamic light-scattering. When the average aspect ratio of the carbon nanotubes is within the above range, charges may be rapidly transferred inside the carbon nanotubes from surfaces thereof.

In some cases, the carbon nanotubes may be functionalized carbon nanotubes. For example, the carbon nanotubes may be carbon nanotubes having surface which has been modified to include a reactive group such as a hydroxy group, a carboxyl group, an amine group, an amide group, or a halogen group and/or carbon nanotubes having a surface to which an oligomer or a polymer is attached thereto via covalent bonding.

The second carbon material may have porosity of about 30% to about 60%, or about 35% to about 60%, or about 40% to about 50%. The porosity of the second carbon material refers to the percentage of empty space (e.g., pores or voids) which is present between particles of the second carbon material of the second layer.

As such, the second carbon material has composition and porosity which is different from those of the first carbon material of the first layer and thus, during the process of discharging, space for transfer of the electrolyte in the positive electrode may be secured.

A total amount of the first carbon material and the second carbon material may be, for example, from about 50 parts by weight to about 80 parts by weight, or about 55 parts by weight to about 75 parts by weight, or about 60 parts by weight to about 75 parts by weight, based on 100 parts by weight of the positive electrode.

At least one of the first electrolyte and the second electrolyte may include an ionic liquid. At least one of the first electrolyte and the second electrolyte may include an ionic liquid and a lithium salt. The ionic liquid and the lithium salt may be used as the first electrolyte and/or the second electrolyte. In another embodiment, the ionic liquid and the lithium salt may be used in combination with an organic solvent as the first electrolyte and/or the second electrolyte. A molar ratio (IL/Li) of ionic liquid (IL) to lithium ions (Li) may be from about 0.1 to about 2.0, for example, from about 0.2 to about 1.8, for example, from about 0.4 to about 1.5. The electrolyte having the molar ratio within the above ranges may have further enhanced ionic conductivity.

The ionic liquid may include a cation including an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, a triazole-based cation, or a combination thereof; and includes an anion including $BF_4^-$, $PF_6^-$, $AsF_6^-$, $SbF_6^-$, $AlCl_4^-$, $HSO_4^-$, $ClO_4^-$, $Cl^-$, $Br^-$, $I^-$, $SO_4^-$, $CF_3SO_3^-$, $CF_3CO_2^-$, $(C_2F_5SO_2)(CF_3SO_2)N^-$, $NO_3^-$, $Al_2Cl_7^-$, $CH_3COO^-$, $CH_3SO_3^-$, $CF_3SO_3^-$, $(CF_3SO_2)_3C^-$, $(CF_3CF_2SO_2)_2N^-$, $(CF_3SO_2)_2N^-$, $(FSO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $SF_5)_3C^-$, $(O(CF_3)_2C_2(CF_3)_2O)_2PO^-$, or a combination thereof.

For example, the ionic liquid may include a compounds including a N,N-diethyl-N-methyl-N-(2-methoxyethyl)ammonium cation and an anion comprising $C_2F_5SO_2$) $(CF_3SO_2)N^-$, $(CF_3CF_2SO_2)_2N^-$ $(CF_3SO_2)_2N^-$, $(FSO_2)_2N^-$, or a combination thereof.

In some cases, the organic solvent used may be a carbonate-based compound, a glyme-based compound, a dioxolane-based compound, or the like.

The carbonate-based compound may include ethylene carbonate, propylene carbonate, dimethyl carbonate, fluoroethylene carbonate, diethyl carbonate, ethyl methyl carbonate, or a combination thereof.

The glyme-based solvent may include poly(ethylene glycol) dimethyl ether (PEGDME, polyglyme), tetra(ethylene glycol) dimethyl ether (TEGDME, tetraglyme), tri(ethylene glycol) dimethyl ether (triglyme), poly(ethylene glycol) dilaurate (PEGDL), poly(ethylene glycol) monoacrylate (PEGMA), poly(ethylene glycol) diacrylate (PEGDA), or a combination thereof.

The dioxolane-based compound may include 3-dioxolane, 4,5-diethyl-dioxolane, 4,5-dimethyl-dioxolane, 4-methyl-1,3-dioxolane, and 4-ethyl-1,3-dioxolane. In addition, the organic solvent may be 2,2-dimethoxy-2-phenylacetophenone, dimethoxyethane, diethoxyethane, tetrahydrofuran, γ-butyrolactone, or the like, or a combination thereof.

The lithium salt may include $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ where x and y are natural numbers, LiF, LiBr, LiCl, LiOH, LiI, $LiB(C_2O_4)_2$ (lithium bis(oxalato) borate; LiBOB), or a combination thereof. However, the present disclosure is not limited to the above examples, and any suitable lithium salt may be used.

The amount of the lithium salt may be from about 30 parts by weight to about 60 parts by weight, based on 100 parts by weight of the positive electrode. When the amount of the lithium salt is within the above range, sufficient lithium ion conductivity may be obtained.

Both the first binder and the second binder may be a hydrophobic binder. Each of the first binder and the second binder may be independently polytetrafluoroethylene (PTFE), a tetrafluoroethylene-hexafluoropropylene copolymer (FEP), a tetrafluoroethylene-perfluoroalkylvinylether copolymer (PFA), ethylene/tetrafluoroethylene (ETFE), an ethylenechlorotrifluoro-ethylene copolymer (ECTFE), polyvinylidene fluoride, a polyvinylidenefluoride-hexafluoropropylene copolymer (PVdF-HFP), or a combination thereof.

The first binder may have a high affinity for the first electrolyte and the second binder may have a high affinity with the second electrolyte, included in the positive electrode. For example, the first binder and the second binder have a high affinity for the ionic liquid included in the first electrolyte and the second electrolyte, respectively, and a binding strength between the first carbon material of the first layer and the second carbon material of the second layer may be increased, thereby enhancing the mechanical strength of the positive electrode and also enhancing the ionic conductivity thereof.

A total amount of the first binder and the second binder may be from about 10 wt % to about 80 wt %, or about 15 wt % to about 75 wt %, based on a total weight of the first carbon material and the second carbon material. For example, the total amount of the first binder and the second binder may be from about 20 wt % to about 60 wt % based on the total weight of the first carbon material and the second carbon material.

A catalyst for oxidation/reduction of oxygen may be added to the positive electrode. Examples of the catalyst include precious metal-based catalysts such as platinum, gold, silver, palladium, ruthenium, rhodium, and osmium; oxide-based catalysts such as a manganese oxide, an iron oxide, a cobalt oxide, and a nickel oxide; and an organic metal-based catalyst such as cobalt phthalocyanine, but the present disclosure is not limited to the above examples. That is, any catalyst suitable for oxidation/reduction of oxygen may be used.

In addition, the catalyst may be supported on a catalyst support. The catalyst support may be an oxide, a zeolite, a clay-based mineral, carbon, or the like, or a combination thereof. The oxide may include alumina, silica, zirconium oxide, titanium dioxide, or a combination thereof. The oxide may be a metal including cerium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), tungsten (W), or a combination thereof. Examples of the carbon include carbon black such as Ketjen black, acetylene black, channel black, and lamp black; graphite such as natural graphite, artificial black, and expandable graphite; activated carbon; and carbon fibers. However, the present disclosure is not limited to the above examples and any suitable catalyst support may be used.

A metal-air battery according to another embodiment may include: a negative electrode including lithium (Li) or a Li alloy; the positive electrode described above; and a separator between the negative electrode and the positive electrode.

Figure 3:
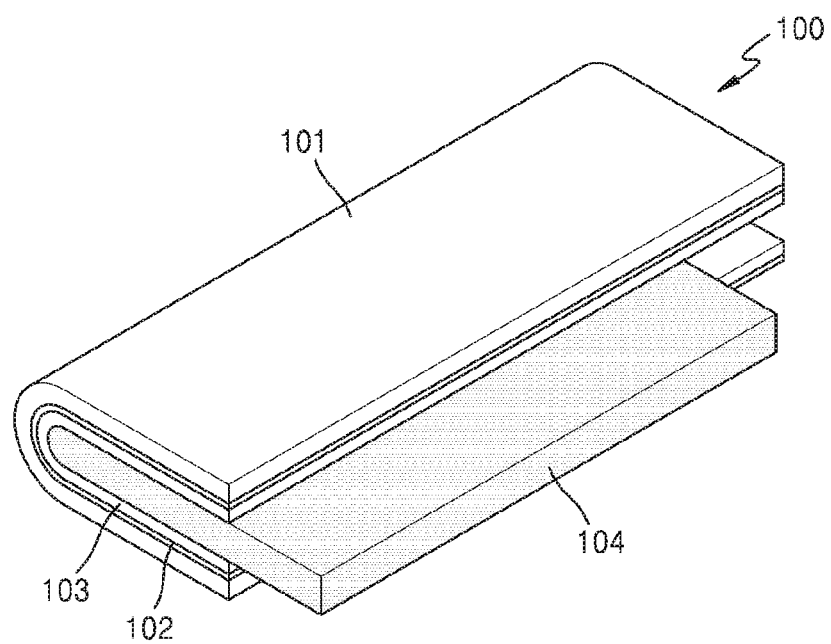
FIG. 3 is a schematic view of a structure of a lithium air battery, according to an embodiment.

FIG. 3 is a schematic view illustrating a structure of a lithium air battery 100 according to an embodiment.

As illustrated in FIG. 3, the lithium air battery 100 includes: a negative electrode including a negative electrode current collector (not shown) and Li metal 101 on a surface of the negative electrode current collector; a negative electrode protective film 102 on a surface of the Li metal 101, a positive electrode 103 on a surface of the negative electrode protective film 102, and a gas diffusion layer 104 on a surface of the positive electrode 103. In this regard, to contact a surface of the negative electrode protective film 102 on which the positive electrode 103 is not disposed, with the gas diffusion layer 104, the negative electrode including the Li metal 101 disposed on one surface of the negative electrode current collector and the negative electrode protective film 102 are bent at an angle of 180°.

The negative electrode current collector (not shown) may be formed of a material including stainless steel, copper, nickel, iron, cobalt, or a combination thereof, but the present disclosure is not limited to the above examples. That is, any metallic substrate with high electrical conductivity may be used. For example, the negative electrode current collector (not shown) may be a conductive oxide substrate, a conductive polymer substrate, or the like. In addition, the negative electrode current collector (not shown) may have various structures, in addition to a structure in which a substrate is entirely formed of a conductive material, such as a structure in which a surface of an insulating substrate is coated with a conductive metal, a conductive metal oxide, or a conductive polymer. The current collector may be a flexible substrate. Thus, the current collector may be easily bent. In addition, after being bent, the current collector may be easily returned to its original shape.

The negative electrode may include Li or a Li alloy. The Li metal or Li alloy may have a thickness of less than about 100 μm. For example, the thickness of the Li metal or Li alloy may be about 80 μm or less, for example, about 60 μm or less. A battery including the Li metal may have stable cycle characteristics. Non-limiting examples of the Li alloy include an alloy containing silicon (Si), tin (Sn), aluminum (Al), germanium (Ge), lead (Pb), bismuth (Bi), or antimony (Sb); a Si—Y' alloy (where Y' is an alkali metal, an alkali earth metal, Groups 13 to 16 elements, a transition metal, a rare-earth element, or a combination thereof; and is not Si); and a Sn—Y' alloy (where Y' is an alkali metal, an alkali earth metal, Groups 13 to 16 elements, a transition metal, a rare-earth element, or a combination thereof; and is not Si). The element Y' may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or a combination thereof.

The negative electrode protective film 102 may be an electrolyte membrane or a separator, with a coating layer formed thereon. For example, the negative electrode protective film 102 may be a separator with a coating layer formed thereon. The separator may include, on a surface thereof, a coating layer including a lithium ion conductive polymer, a lithium ion conductive inorganic material, or a combination thereof. The coating layer may have a thickness of about 0.01 μm to about 50 μm.

The negative electrode protective film 102 may reduce surface resistance of the negative electrode due to a reaction with the electrolyte and may have enhanced ionic conductivity.

The separator may be any separator commonly used in a metal-air battery, for example, a lithium air battery. As the separator, a separator having low resistance to transfer of ions in the electrolyte and high electrolyte-retaining ability may be used. Examples of the separator may include glass fiber, polyester, Teflon, polyethylene, polypropylene, polytetrafluoroethylene (PTFE), or a combination thereof, each of which may be a non-woven or a woven fabric.

The lithium ion conductive polymer may include an ionic liquid polymer. The ionic liquid polymer may be a compound obtained in a polymer form or may be obtained by polymerization of ionic liquid monomers. The ionic liquid polymer has high solubility for an organic solvent and, when added to the electrolyte, may further enhance ionic conductivity.

The ionic liquid polymer may include a polymer represented by Formula 1 below:

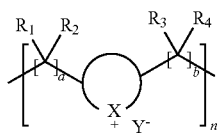

Formula 1 wherein, in Formula 1,

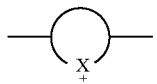

represents a 3- to 31-membered ring containing at least one heteroatom and 2 to 30 carbon atoms;

X may be $-N(R_2)(R_3)$, $-N(R_2)_2-$, $-P(R_2)_2-$, or $-P(R_2)(R_3)-$;

each of $R_1$ to $R_4$ may be independently hydrogen, a substituted or unsubstituted $C_1$-$C_{30}$ alkyl group, a substituted or unsubstituted $C_1$-$C_{30}$ alkoxy group, a substituted or unsubstituted $C_6$-$C_{30}$ aryl group, a substituted or unsubstituted $C_6$-$C_{30}$ aryloxy group, a substituted or unsubstituted $C_3$-$C_{30}$ heteroaryl group, a substituted or unsubstituted $C_3$-$C_{30}$ heteroaryloxy group, a substituted or unsubstituted $C_4$-$C_{30}$ cycloalkyl group, a substituted or unsubstituted $C_3$-$C_{30}$ heterocycloalkyl group, or a substituted or unsubstituted $C_2$-$C_{100}$ alkylene oxide group;

$Y^-$ may be an anion;

each of a and b is independently an integer of 1 to 5; and n may be an integer of 500 to 2800.

The 3- to 31-membered ring containing at least one heteroatom and 2 to 30 carbon atoms may be a substituted or unsubstituted $C_2$-$C_{30}$ hetero ring or a substituted or unsubstituted $C_2$-$C_{30}$ heteroaryl ring, and the heteroatom may nitrogen (N), oxygen (O), phosphorus (P), and sulfur (S).

In Formula 1 above,

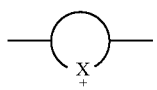

may be represented by a structure in Formula 2 below:

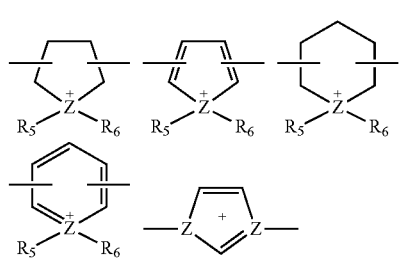

Formula 2 wherein, in Formula 2, Z is N, S, or P; each of $R_5$ and $R_6$ may be independently hydrogen, a $C_1$-$C_{30}$ alkyl group, a $C_1$-$C_{30}$ alkoxy group, a $C_6$-$C_{30}$ aryl group, a $C_6$-$C_{30}$ aryloxy group, a $C_3$-$C_{30}$ heteroaryl group, a $C_3$-$C_{30}$ heteroaryloxy group, a $C_4$-$C_{30}$ cycloalkyl group, a $C_3$-$C_{30}$ heterocycloalkyl group, a $C_2$-$C_{30}$ alkenyl group, a $C_2$-$C_{30}$ alkynyl group, or a $C_2$-$C_{100}$ alkylene oxide group.

For example, the ionic liquid polymer of Formula 1 may be a polymer represented by Formula 3 below:

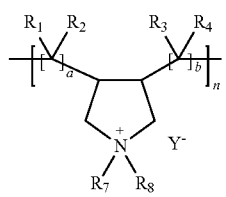

Formula 3 wherein, in Formula 3, each of $R_1$ to $R_4$ may be independently hydrogen, a substituted or unsubstituted $C_1$-$C_{30}$ alkyl group, a substituted or unsubstituted $C_1$-$C_{30}$ alkoxy group, a substituted or unsubstituted $C_6$-$C_{30}$ aryl group, a substituted or unsubstituted $C_6$-$C_{30}$ aryloxy group, a substituted or unsubstituted $C_3$-$C_{30}$ heteroaryl group, a substituted or unsubstituted $C_3$-$C_{30}$ heteroaryloxy group, a substituted or unsubstituted $C_4$-$C_{30}$ cycloalkyl group, a substituted or unsubstituted $C_3$-$C_{30}$ heterocycloalkyl group, or a substituted or unsubstituted $C_2$-$C_{100}$ alkylene oxide group; each of each of R, and $R_8$ may be independently hydrogen, a $C_1$-$C_{30}$ alkyl group, a $C_1$-$C_{30}$ alkoxy group, a $C_6$-$C_{30}$ aryl group, a $C_6$-$C_{30}$ aryloxy group, a $C_3$-$C_{30}$ heteroaryl group, a $C_3$-$C_{30}$ heteroaryloxy group, a $C_4$-$C_{30}$ cycloalkyl group, a $C_3$-$C_{30}$ heterocycloalkyl group, a $C_2$-$C_{30}$ alkenyl group, a $C_2$-$C_{30}$ alkynyl group, or a $C_2$-$C_{100}$ alkylene oxide group; $Y^-$ may be $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, or $(CF_3SO_2)_2N^-$; each of a and b may be independently an integer of 1 to 5; and n may be an integer of 500 to 2800.

For example, in Formula 3 above, R, and $R_8$ may be a $C_1$-$C_{10}$ alkyl group, each of $R_1$ to $R_4$ may be independently hydrogen or a $C_1$-$C_{10}$ alkyl group, a and b may be 1, and $Y^-$ may be $BF_4^-$, $PF_6^-$, $ClO_4^-$, $CH_3SO_3^-$, $CF_3CO_2^-$, $(CF_3SO_2)_2N^-$, $CF_3SO_3^-$, $(C_2F_5SO_2)_2N^-$, or $(C_2F_5SO_2)(CF_3SO_2)N^-$.

For example, the ionic liquid polymer may be poly(diallyldimethylammonium) bis(trifluoromethanesulfonyl)imide (TFSI).

The substituents used in Formulae 1 to 3 above are defined as follows.

The term "substituted" means that the compound or group is substituted with at least one substituent independently selected from a halogen atom, a $C_1$-$C_{20}$ alkyl group substituted with a halogen atom (e.g., —CCF$_3$, —CHCF$_2$, —CH$_2$F, —CCl$_3$, or the like), a hydroxyl group, a nitro group, a cyano group, an amino group, an amidino group, a hydrazine, a hydrazone, a carboxyl group or a salt thereof, a sulfonic acid or a salt thereof, a phosphoric acid or a salt thereof, a $C_1$-$C_{20}$ alkyl group, a $C_2$-$C_{20}$ alkenyl group, a $C_2$-$C_{20}$ alkynyl group, a $C_3$-$C_{20}$ cycloalkyl group, a $C_6$-$C_{20}$ aryl group, a $C_6$-$C_{20}$ heteroaryl group, a $C_6$-$C_{20}$ arylalkyl group, or a $C_6$-$C_{20}$ heteroarylalkyl group.

The halogen atom may be fluorine, bromine, chloride, iodine, or the like.

The term "$C_1$-$C_{30}$ alkyl group" as used herein refers to a saturated branched or non-branched (straight chain or linear) aliphatic hydrocarbon group having 1 to 30 carbon atoms. Non-limiting examples of the alkyl group include methyl, ethyl, propyl, isobutyl, sec-butyl, ter-butyl, neo-butyl, isoamyl, hexyl, or the like. The alkyl group may be substituted, or at least one hydrogen atom of the alkyl group may be substituted with a substituent as defined above.

The term "$C_1$-$C_{30}$ alkoxy group" as used herein refers to an alkyl group bonded to an oxygen atom. Non-limiting examples of the alkoxy group include a methoxy group, an ethoxy group, and a propoxy group. The alkoxy group may be unsubstituted or at least one hydrogen atom of the alkoxy group may be substituted with a substituent as defined above.

The term "$C_2$-$C_{100}$ alkylene oxide group" as used herein refers to an alkylene group bonded to an oxygen atom, for example, a compound having the formula

wherein R1 is hydrogen or a C1-C12 alkyl group. Non-limiting examples of the alkylene oxide group include ethylene oxide, propylene oxide, and butylene oxide.

The term "$C_2$-$C_{20}$ alkenyl group" used herein as a substituent refers to a branched or non-branched chain, monovalent hydrocarbon group having at least one carbon-carbon double bond and 2 to 20 carbon atoms. For example, the alkenyl group may be vinylene, allylene, or the like.

The term "$C_2$-$C_{20}$ alkynyl group" used herein as a substituent refers to a branched or non-branched chain, monovalent hydrocarbon group having at least one carbon-carbon triple bond and 2 to 20 carbon atoms. For example, the alkynyl group may be ethynyl, butynyl, isobutynyl, isopropynyl, or the like.

The term "$C_3$-$C_{20}$ cycloalkyl group" used herein refers to a monovalent group having one or more rings in which all ring members are carbon. For example, the cycloalkyl group may be cyclopropyl, cyclobutyl, cyclopentyl, cyclohexyl, or the like.

The term "$C_6$-$C_{30}$ aryl group" as used herein refers to a hydrocarbon group having an aromatic ring, and includes monocyclic and polycyclic hydrocarbons wherein the additional ring(s) of the polycyclic hydrocarbon may be aromatic or nonaromatic (e.g., phenyl or naphthyl).

The term "$C_6$-$C_{30}$ aryloxy group" as used herein refers to a $C_6$-$C_{30}$ aryl group with an oxygen atom bonded thereto, and the aryloxy group may be, for example, a phenyloxy group, naphthyloxy, or the like.

The term "$C_3$-$C_{30}$ heteroaryl group" as used herein refers to a monovalent carbocyclic ring containing at least one heteroatom selected from N, O, P, and S, and in which the remaining ring atoms are carbon. For example, the heteroaryl group may be pyridyl or the like.

The term "$C_3$-$C_{30}$ heteroaryloxy group" as used herein refers to a $C_6$-$C_{30}$ heteroaryl group with an oxygen atom bonded thereto.

The terms "$C_4$-$C_{30}$ cycloalkyl group" and "$C_3$-$C_{30}$ heterocycloalkyl group" used herein refer to an alkyl group bonded to a cycloaryl group or an alkyl group bonded to a heterocycloaryl group, respectively.

The lithium ion conductive inorganic material may be a lithium ion conductive glass-ceramic. The lithium ion conductive glass-ceramic may be, for example, $Li_{1+x+y}(Al, Ga)_x(Ti, Ge)_{2-x}Si_yP_{3-y}O_{12}$, where $0 \leq x \leq 1$ and $0 \leq y \leq 1$, for example, $0 \leq x \leq 0.4$ and $0 \leq y \leq 0.6$, for example, $0.1 \leq x \leq 0.3$ and $0.1 \leq y \leq 0.4$. Non-limiting examples of the lithium ion conductive glass-ceramic include lithium-aluminum-germanium-phosphate (LAGP), lithium-aluminum-titanium-phosphate (LATP), and lithium-aluminum-titanium-silicon-phosphate (LATSP).

The lithium ion conductive inorganic material may further include an inorganic solid electrolyte component in addition to the lithium ion conductive glass-ceramic component. The inorganic solid electrolyte component may include $Cu_3N$, $Li_3N$, LiPON, or the like. The lithium ion conductive inorganic material may be further disposed as a lithium ion conductive solid electrolyte membrane (not shown) on a surface of the positive electrode 103 facing the separator. The lithium ion conductive solid electrolyte membrane (not shown) may be formed as a single layer or in multiple layers.

The positive electrode 103 may be the positive electrode for a metal-air battery described above.

The gas diffusion layer 104 diffuses oxygen from the outside and supplies the oxygen to a metal-air battery, for example, a lithium air battery. The gas diffusion layer 104 may have electrical conductivity and thus may serve as a positive electrode current collector. The gas diffusion layer 104 may be formed of a porous carbonaceous material, a porous metal, or the like, but the present disclosure is not limited thereto. That is, any material which is suitable for forming a gas diffusion layer may be used. For example, the porous carbonaceous material may be a non-woven carbon fiber or the like. A gas diffusion layer formed of a conductive carbonaceous material has a lower density than that of a gas diffusion layer formed of a metal, and thus may further enhance energy density of the lithium air battery.

The metal-air battery may be a folding type. In addition, although not illustrated in the drawings, the metal-air battery may be a three-dimensional (3D) metal-air battery bent a plurality of times in a thickness direction.

As used herein, the term "air" is not limited to atmospheric air, and may include a combination of gases including oxygen, or pure oxygen gas. The metal-air battery may be either a metal primary battery or a metal secondary battery. The metal-air battery may have various forms and may have, for example, a coin, button, sheet, stack, cylindrical, planar, or horn form. In addition, the metal-air battery may be applied to large-scale batteries used in electric vehicles and the like.

One or more embodiments of the present disclosure will now be described in further detail with reference to the following examples and comparative examples. However, these examples are provided only for illustrative purposes and are not intended to limit the scope of the present disclosure.

EXAMPLES

Example 1: Manufacture of Positive Electrode for Lithium Air Battery

Activated carbon powder having a BET specific surface area of about 1100 m$^2$/g (average particle diameter: about 30 nm, manufactured by Sigma-Aldrich) as a first carbon material; polytetrafluoroethylene (PTFE) (manufactured by Sigma-Aldrich) as a first binder; and an electrolyte prepared by mixing 1 molar (M) lithium bis(trifluoromethane)sulfonimide (LiTFSI) with N,N-diethyl-N-methyl-N-(2-methoxyethyl)ammonium (DEME) (manufactured by Sigma-Aldrich), as a first electrolyte, were weighed at a weight ratio of 1:0.3:2 and then kneaded to prepare a first paste. The first paste was pressed on a Teflon base using a roll press and dried to form a first layer having a thickness of about 3 μm.

Multi-walled carbon nanotubes having a BET specific surface area of about 450 m$^2$/g (average diameter: about 8 nm, manufactured by Sigma-Aldrich) as a second carbon material; PTFE (manufactured by Sigma-Aldrich) as a second binder; and an electrolyte prepared by mixing 1 M LiTFSI with DEME (manufactured by Sigma-Aldrich), as a second electrolyte, were weighed at a weight ratio of 1:0.2:2 and then kneaded to prepare a second paste. The second paste was pressed on a Teflon base using a roll press and dried to form a second layer having a thickness of about 27 μm.

In this regard, a total weight of the positive electrode (air electrode) was 3.5 mg/cm$^2$.

Example 2: Manufacture of Positive Electrode for Lithium Air Battery

A positive electrode (air electrode) for a lithium air battery, having a double-layered structure, was manufactured in the same manner as in Example 1, except that activated carbon powder having a BET specific surface area of about 1100 m$^2$/g (average particle diameter: about 30 nm, manufactured by Sigma-Aldrich) as a first carbon material; PTFE (manufactured by Sigma-Aldrich) as a first binder; and an electrolyte prepared by mixing 1 M LiTFSI with DEME (manufactured by Sigma-Aldrich), as a first electrolyte, were weighed at a weight ratio of 1:0.4:2 and then kneaded to prepare a first paste.

Comparative Example 1: Manufacture of Positive Electrode for Lithium Air Battery Multi-walled carbon nanotubes having a BET specific surface area of about 450 m$^2$/g (average diameter: about 8 nm, manufactured by Sigma-Aldrich); PTFE (manufactured by Sigma-Aldrich) as a binder; and an electrolyte, prepared by mixing 1 M LiTFSI with DEME (manufactured by Sigma-Aldrich), were weighed at a weight ratio of 1:0.2:2 and then kneaded to prepare a paste. The paste was pressed on a Teflon base using a roll press and dried, thereby completing the manufacture of a positive electrode having a thickness of about 30 μm.

In this regard, a total weight of the positive electrode (air electrode) was 3.5 mg/cm$^2$.

Comparative Example 2: Manufacture of Positive Electrode for Lithium Air Battery A positive electrode (air electrode) for a lithium air battery, having a double-layered structure, was manufactured in the same manner as in Example 1, except that activated carbon powder having a BET specific surface area of about 1100 m$^2$/g (average particle diameter: about 30 nm, manufactured by Sigma-Aldrich) as a first carbon material; PTFE (manufactured by Sigma-Aldrich) as a first binder; and an electrolyte, prepared by mixing 1 M LiTFSI with DEME (manufactured by Sigma-Aldrich), as a first electrolyte, were weighed at a weight ratio of 1:0.2:2 and then kneaded to prepare a first paste.

Comparative Example 3: Manufacture of Positive Electrode for Lithium Air Battery A positive electrode (air electrode) for a lithium air battery, having a double-layered structure, was manufactured in the same manner as in Example 1, except that multi-walled carbon nanotubes having a BET specific surface area of about 450 m$^2$/g (average diameter: about 8 nm, manufactured by Sigma-Aldrich) as a first carbon material; PTFE (manufactured by Sigma-Aldrich) as a first binder; and an electrolyte, prepared by mixing 1 M LiTFSI with DEME (manufactured by Sigma-Aldrich), as a first electrolyte, were weighed at a weight ratio of 1:0.4:2 and then kneaded to prepare a first paste.

Comparative Example 4: Manufacture of Positive Electrode for Lithium Air Battery A positive electrode (air electrode) for a lithium air battery, having a double-layered structure, was manufactured in the same manner as in Example 1, except that multi-walled carbon nanotubes having a BET specific surface area of about 450 m$^2$/g (average diameter: about 8 nm, manufactured by Sigma-Aldrich) as a first carbon material; PTFE (manufactured by Sigma-Aldrich) as a first binder; and an electrolyte, prepared by mixing 1 M LiTFSI with DEME (manufactured by Sigma-Aldrich), as a first electrolyte, were weighed at a weight ratio of 1:0.3:2 and then kneaded to prepare a first paste, wherein a thickness of a first layer was 9 μm and a thickness of a second layer was 21 μm.

Example 3: Manufacture of Lithium Air Battery

Manufacture of Negative Electrode Protective Film

A polymer ionic liquid solution was coated onto a separator having a thickness of about 8 μm (manufactured by SKI) and dried in a vacuum at 60° C. for 6 hours. The polymer ionic liquid solution was prepared by mixing, at a weight ratio of 45:42.6:12.4, N-butyl-N-methylpyrrolidinium bis(trifluoromethanesulfonyl)imide, poly(diallyldimethylammonium bis(trifluoromethanesulfonyl)imide)-bis(trifluoromethane)sulfoneimide (TFSI), and 1 M LiTFSI mixed with acetonitrile. A total weight of the negative electrode protective film was 3.0 mg/cm$^2$.

Manufacture of Lithium Air Battery

Li metal having a thickness of 30 μm (2.4 cm×3.4 cm) was disposed on a negative electrode current collector having a size of 2.4 cm×3.4 cm, and the negative electrode protective film manufactured above was disposed on the Li metal.

The positive electrode (1 cm×3 cm) manufactured according to Example 1 was disposed on the negative electrode protective film such that the positive electrode of Example 1 contacts edges of the negative electrode protective film and covers half the area thereof, and a gas diffusion layer (GDL) having a size of 1.5 cm×3 cm (manufactured by SGL, 25BC) was disposed on the positive electrode.

Subsequently, the negative electrode protective film, the Li metal, and the negative electrode current collector were bent at an angle of 180° so that a surface of the negative electrode protective film, on which the positive electrode was not disposed, contacted the GDL, thereby completing the manufacture of a lithium air battery.

The structure of the lithium air battery is illustrated in FIG. 3. The negative electrode current collector is not shown in FIG. 3. Air is supplied via a side surface of the GDL.

Example 4: Manufacture of Lithium Air Battery

A lithium air battery was manufactured in the same manner as in Example 3, except that the positive electrode (1 cm×3 cm) manufactured according to Example 2 was used instead of the positive electrode (1 cm×3 cm) of Example 1.

Comparative Examples 5 to 8: Manufacture of Lithium Air Batteries

Lithium air batteries were manufactured in the same manner as in Example 3, except that each of the positive electrodes (1 cm×3 cm) manufactured according to Comparative Examples 1 to 4 was used instead of the positive electrode (1 cm×3 cm) of Example 1.

Evaluation Example 1: Evaluation of Charge/Discharge Characteristics

Figure 4:
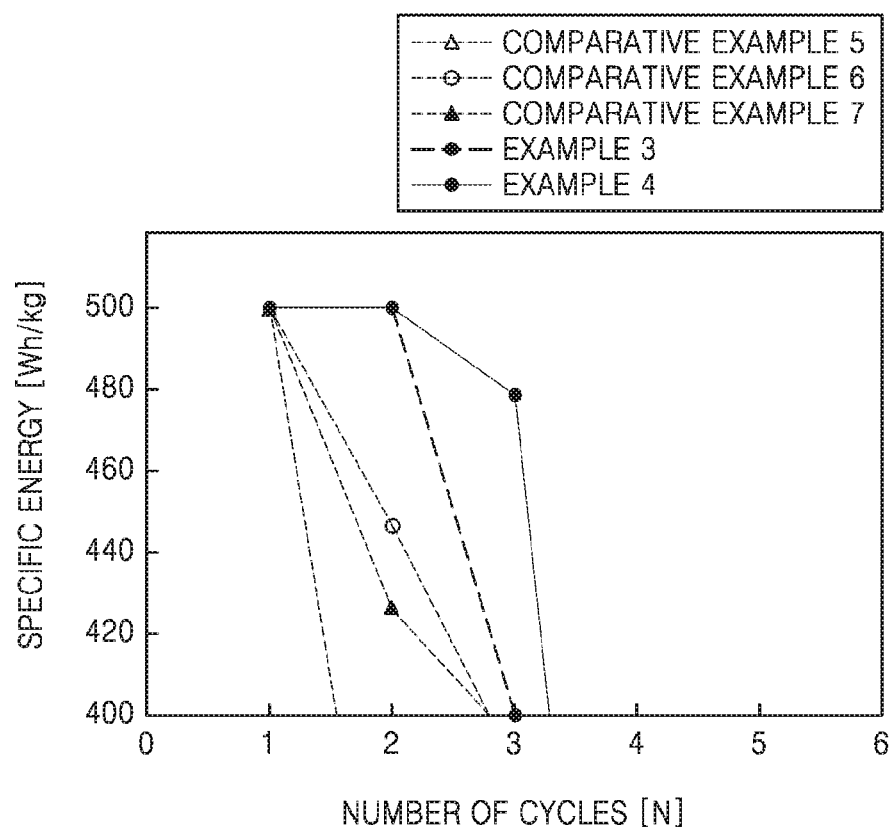
FIG. 4 is a graph of specific energy (watt-hours per kilogram, Wh/kg) versus number of cycles (N), showing cycle lifespan characteristics of lithium air batteries manufactured according to Examples 3 and 4 and Comparative Examples 5 to 7.
Figure 5:
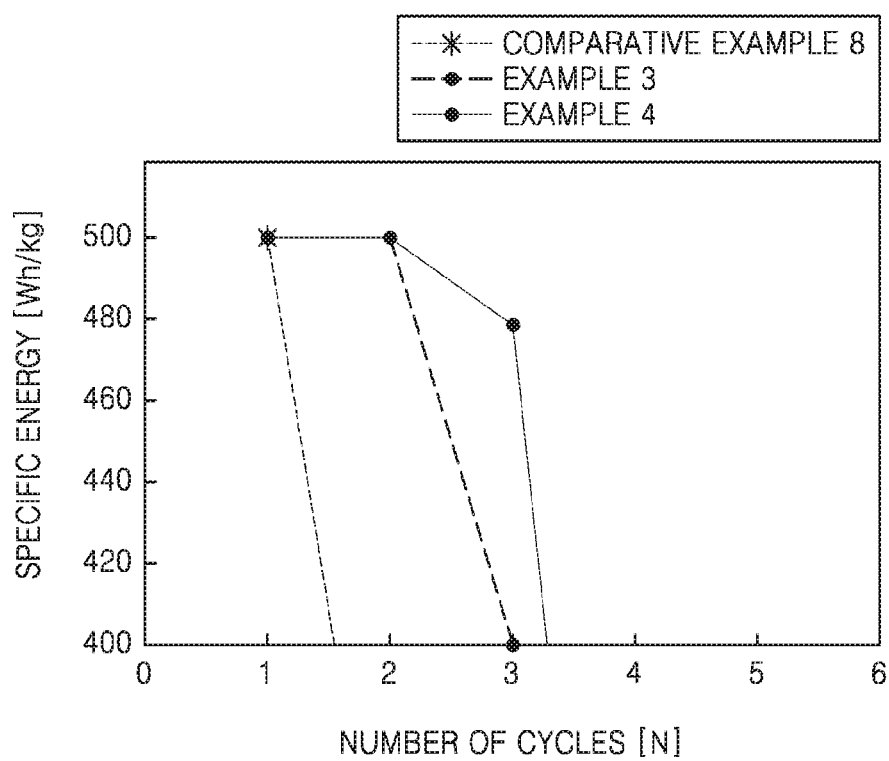
FIG. 5 is a graph of specific energy (watt-hours per kilogram, Wh/kg) versus number of cycles (N), showing cycle lifespan characteristics of lithium air batteries manufactured according to Examples 3 and 4 and Comparative Example 8.

Each of the lithium air batteries manufactured according to Examples 3 and 4 and Comparative Examples 5 to 8 was subjected to 4 cycles of charging and discharging at a constant current of 0.24 milliampere per square centimeter (mA/cm$^2$), at a voltage ranging from 1.7 V to 4.2 V (vs. Li), at 80° C., and at 1 atmosphere (atm) pressure in an oxygen atmosphere, and the charge/discharge profile results are illustrated in FIGS. 4 and 5.

In FIGS. 4 and 5, a vertical axis represents specific energy measured as watt-hours per kilogram, in which the unit weight (e.g., kilogram) is a total weight of the first carbon material, the second carbon material, the first electrolyte, the second electrolyte, the first binder, the second binder, the Li metal as a negative electrode, the negative electrode protective film, and the GDL.

Referring to FIGS. 4 and 5, it can be seen that the lithium air batteries of Examples 3 and 4 maintain a specific energy density up to 3 cycles of charging and discharging. In contrast, the lithium air batteries of Comparative Examples 5 to 8 exhibit a rapidly reduced specific energy after one or two cycles of charging and discharging. From these results, it is confirmed that the lithium air batteries of Examples 3 and 4 have a longer lifespan than those of the lithium air batteries of Comparative Examples 5 to 8.

As is apparent from the foregoing description, a positive electrode for a metal-air battery, according to an embodiment, may be a double-layered positive electrode. In the double-layered positive electrode, a first carbon material of a first layer may be different from a second carbon material of a second layer, the first carbon material may have a larger BET specific surface area than that of the second carbon material, and the amount of a first binder of the first layer may be about 1.5 times to about 3 times greater that of a second binder of the second layer. A metal-air battery including the positive electrode may have enhanced cycle lifespan characteristics.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A positive electrode for a metal-air battery, the positive electrode comprising:
a first layer disposed on a surface of an electrolyte membrane or a separator and comprising a first carbon material, a first electrolyte, and a first binder having an affinity with the first electrolyte; and
a second layer disposed on the first layer and comprising a second carbon material, a second electrolyte, and a second binder having an affinity with the second electrolyte,
wherein the first carbon material has a Brunauer Emmett Teller specific surface area of about 800 square meters per gram to about 1500 square meters per gram,
wherein the first carbon material is different from the second carbon material, the first carbon material has a Brunauer Emmett Teller specific surface area which is greater than a Brunauer Emmett Teller specific surface area of the second carbon material, and
wherein an amount of the first binder is about 1.5 times to about 3 times greater than an amount of the second binder.

2. The positive electrode of claim 1, wherein the first layer has a thickness which is less than a thickness of the second layer.

3. The positive electrode of claim 1, wherein a thickness of the first layer is about 1 percent to about 20 percent of a total thickness of the positive electrode.

4. The positive electrode of claim 3, wherein the total thickness of the positive electrode is from about 10 micrometers to about 100 micrometers.

5. The positive electrode of claim 1, wherein the first carbon material comprises activated carbon, mesoporous carbon, graphene, or a combination thereof.

6. The positive electrode of claim 1, wherein the first carbon material has porosity of about 40 percent to about 80 percent.

7. The positive electrode of claim 1, wherein the second carbon material has a Brunauer Emmett Teller specific surface area of about 200 square meters per gram to less than about 800 square meters per gram.

8. The positive electrode of claim 1, wherein the second carbon material comprises carbon nanotubes, carbon nanofibers, carbon nanoribbons, carbon nanobelts, carbon nanorods, or a combination thereof.

9. The positive electrode of claim 1, wherein the second carbon material has porosity of about 30 percent to about 60 percent.

10. The positive electrode of claim 1, wherein at least one of the first electrolyte and the second electrolyte comprises an ionic liquid.

11. The positive electrode of claim 10, wherein the ionic liquid comprises
   a cation comprising an ammonium-containing cation, a pyrrolidinium-containing cation, a pyridinium-containing cation, a pyrimidinium-containing cation, an imidazolium-containing cation, a piperidinium-containing cation, a pyrazolium-containing cation, an oxazolium-containing cation, a pyridazinium-containing cation, a phosphonium-containing cation, a sulfonium-containing cation, a triazole-containing cation, or a combination thereof; and
   an anion comprising $BF_4^-$, $PF_6^-$, $AsF_6^-$, $SbF_6^-$, $AlCl_4^-$, $HSO_4^-$, $ClO_4^-$, $Cl^-$, $Br^-$, $I^-$, $SO_4^-$, $CF_3SO_3^-$, $CF_3CO_2^-$, $(C_2F_5SO_2)(CF_3SO_2)N-$, $NO_3^-$, $Al_2Cl_7^-$, $CH_3COO^-$, $CH_3SO_3^-$, $CF_3SO_3^-$, $(CF_3SO_2)_3C^-$, $(CF_3CF_2SO_2)_2N^-$, $(CF_3SO_2)_2N^-$, $(FSO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof.

12. The positive electrode of claim 10, wherein the ionic liquid comprises a compounds comprising a N,N-diethyl-N-methyl-N-(2-methoxyethyl)ammonium cation and an anion comprising $(C_2F_5SO_2)(CF_3SO_2)N^-$, $(CF_3CF_2SO_2)_2N^-$, $(CF_3SO_2)_2N^-$, $(FSO_2)_2N^-$, or a combination thereof.

13. The positive electrode of claim 1, wherein each of the first binder and the second binder is a hydrophobic binder.

14. The positive electrode of claim 1, wherein each of the first binder and the second binder independently comprises polytetrafluoroethylene, a tetrafluoroethylene-hexafluoropropylene copolymer, a tetrafluoroethylene-perfluoroalkylvinylether copolymer, ethylene/tetrafluoroethylene, an ethylenechlorotrifluoro-ethylene copolymer, polyvinylidene fluoride, a polyvinylidenefluoride-hexafluoropropylene copolymer, or a combination thereof.

15. The positive electrode of claim 1, wherein a total amount of the first binder and the second binder is from about 10 weight percent to about 80 weight percent, based on a total weight of the first carbon material and the second carbon material.

16. A metal-air battery comprising:
   a negative electrode comprising Li or a Li alloy;
   the positive electrode according to claim 1; and
   a separator between the negative electrode and the positive electrode.

17. The metal-air battery of claim 16, wherein the separator comprises a coating layer comprising a lithium ion conductive polymer, a lithium ion conductive inorganic material, or a combination thereof.

18. The metal-air battery of claim 17, wherein the lithium ion conductive polymer comprises an ionic liquid polymer.

19. The metal-air battery of claim 18, wherein the ionic liquid polymer comprises a polymer represented by Formula 1 below:

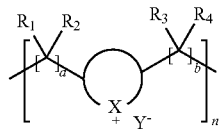

Formula 1 wherein, in Formula 1,

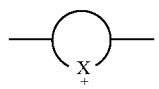

represents a 3 to 31-membered ring containing at least one heteroatom and 2 to 30 carbon atoms;

X is $-N(R_2)(R_3)-$, $-N(R_2)_2-$, $-P(R_2)_2-$, or $-P(R_2)(R_3)-$;

each of $R_1$ to $R_4$ is independently hydrogen, a substituted or unsubstituted $C_1$-$C_{30}$ alkyl group, a substituted or unsubstituted $C_1$-$C_{30}$ alkoxy group, a substituted or unsubstituted $C_6$-$C_{30}$ aryl group, a substituted or unsubstituted $C_6$-$C_{30}$ aryloxy group, a substituted or unsubstituted $C_3$-$C_{30}$ heteroaryl group, a substituted or unsubstituted $C_3$-$C_{30}$ heteroaryloxy group, a substituted or unsubstituted $C_4$-$C_{30}$ cycloalkyl group, a substituted or unsubstituted $C_3$-$C_{30}$ heterocycloalkyl group, or a substituted or unsubstituted $C_2$-$C_{100}$ alkylene oxide group;

$Y^-$ is an anion;

each of a and b is independently an integer of 1 to 5; and n is an integer of 500 to 2800.

20. The metal-air battery of claim 17, wherein the lithium ion conductive inorganic material comprises a lithium ion conductive glass-ceramic.

21. The metal-air battery of claim 17, wherein the coating layer has a thickness of about 0.01 micrometer to about 50 micrometers.

22. The metal-air battery of claim 16, wherein the metal-air battery is foldable.

* * * * *